(12) United States Patent
Kerpel et al.

(10) Patent No.: US 9,710,854 B2
(45) Date of Patent: Jul. 18, 2017

(54) VOLATILITY BASED FUTURES PRODUCTS

(71) Applicant: Chicago Mercantile Exchange, Inc., Chicago, IL (US)

(72) Inventors: John Kerpel, Chicago, IL (US); John Labuszewski, Westmont, IL (US); John Nyhoff, Darien, IL (US); Lori Aldinger, Naperville, IL (US); Richard Co, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 14/134,922

(22) Filed: Dec. 19, 2013

(65) Prior Publication Data

US 2015/0178833 A1   Jun. 25, 2015

(51) Int. Cl.
  *G06Q 40/00* (2012.01)
  *G06Q 40/04* (2012.01)
(52) U.S. Cl.
  CPC .................................. *G06Q 40/04* (2013.01)
(58) Field of Classification Search
  CPC ......... G06Q 40/00; G06Q 40/06; G06Q 40/04
  USPC ........................................ 705/35, 36 R, 37
  See application file for complete search history.

(56) References Cited

U.S. PATENT DOCUMENTS

| | | | |
|---|---|---|---|
| 7,328,184 B1 | 2/2008 | Krause | |
| 7,590,581 B1 | 9/2009 | Payne et al. | |
| 8,027,904 B2 * | 9/2011 | O'Callahan | G06Q 40/00 705/35 |
| 8,036,972 B2 | 10/2011 | Glinberg et al. | |
| 8,165,953 B2 * | 4/2012 | O'Connell | G06Q 20/10 705/1.1 |
| RE43,435 E | 5/2012 | Krause | |
| 2004/0034587 A1 * | 2/2004 | Amberson et al. | 705/36 |
| 2004/0039673 A1 * | 2/2004 | Amberson et al. | 705/36 |
| 2007/0106583 A1 * | 5/2007 | Hiatt, Jr. | G06Q 40/00 705/35 |
| 2007/0136180 A1 * | 6/2007 | Salomon | G06Q 40/04 705/37 |
| 2007/0198387 A1 * | 8/2007 | Uenohara et al. | 705/36 R |
| 2007/0219893 A1 * | 9/2007 | Xu | 705/36 R |
| 2008/0015970 A1 * | 1/2008 | Brookfield et al. | 705/37 |
| 2009/0048982 A1 * | 2/2009 | Payton | G06Q 40/06 705/36 R |

(Continued)

OTHER PUBLICATIONS

Colin Bennett and Miguel A. Gil, Measuring Historical Volatility, Close-to-Close, Exponentially Weighted, Parkinson, Garman-Klass, Rogers-Satchell and Yang-Zhang Volatility, Madrid, Feb. 3, 2012, Copyright Santander Investment Bolsa, Sociedad de Valores, S.A., 2012, 12 pages.

(Continued)

*Primary Examiner* — Lalita M Hamilton
(74) *Attorney, Agent, or Firm* — Banner & Witcoff, Ltd.

(57) ABSTRACT

A method of providing a financial product may include obtaining, by a computer device, pricing information about a financial market over a specified duration, the pricing information including at least a high price and a low price occurring within the duration. The computer device may be configured for determining a volatility associated with the market, the volatility based, at least in part, on the pricing information and determining a settlement price for a cash settled futures product using the volatility of the market over the specified duration.

19 Claims, 3 Drawing Sheets

(56) References Cited

U.S. PATENT DOCUMENTS

2013/0317963 A1* 11/2013 Mele ............ G06Q 40/04
                                                  705/37

OTHER PUBLICATIONS

Richard B. Spurgin and Thomas Schneeweis, Efficient Estimation of Intraday Volatility: A Method-of-Moments Approach Incorporating the Trading Range, CISDM Working Paper Series 97-6, Jun. 20, 1997, 27 pages.

S&P Dow Jones Indices, McGraw Hill Financial, Australian Securities Exchange, ASX launches futures product for trading equity market volatility, Sydney, Oct. 21, 2013, 3 pages.

Louis H. Ederington and Wei Guan, Measuring Historical Volatility, University of Oklahoma, University of South Florida St. Petersburg, Aug. 2004, 23 pages.

Petition for Covered Business Method Review of Claims 1-50 of Reissued U.S. Pat. No. Re 43,435 under 35 U.S.C. §321, 37 C.F.R. §42.304, and §18 of the Leahy-Smith America Invents Act, dated Dec. 26, 2015, 59 pages.

U.S. Appl. No. 09/505,947 File History, Exhibit 1002 to Petition for Covered Business Method Review of Claims 1-50 of Reissued U.S. Pat. No. Re 43,435 under 35 U.S.C. §321, 37 C.F.R. §42.304, and §18 of the Leahy-Smith America Invents Act, dated Dec. 26, 2015, 386 pages.

Reissue Patent Application (Original U.S. Pat. No. 7,328,184), Exhibit 1003 to Petition for Covered Business Method Review of Claims 1-50 of Reissued U.S. Pat. No. Re 43,435 under 35 U.S.C. §321, 37 C.F.R. §42.304, and §18 of the Leahy-Smith America Invents Act, dated Dec. 26, 2015, 333 pages.

Declaration of Dr. Craig Pirrong for Covered Business Method Review of U.S. Pat. No. RE43,435, Exhibit 1006 to Petition for Covered Business Method Review of Claims 1-50 of Reissued U.S. Pat. No. Re 43,435 under 35 U.S.C. §321, 37 C.F.R. §42.304, and §18 of the Leahy-Smith America Invents Act, dated Dec. 26, 2015, 35 pages.

Pirrong CV with publication listing, Exhibit 1007 to Petition for Covered Business Method Review of Claims 1-50 of Reissued U.S. Pat. No. Re 43,435 under 35 U.S.C. §321, 37 C.F.R. §42.304, and §18 of the Leahy-Smith America Invents Act, dated Dec. 26, 2015, 14 pages.

Parkinson, Michael, "The Extreme Value Method for Estimating the Variance of the Rate of Return," Chicago Journals, The Journal of Business, vol. 53, No. 1 (Jan. 1980), pp. 61-65, Exhibit 1008 to Petition for Covered Business Method Review of Claims 1-50 of Reissued U.S. Pat. No. Re 43,435 under 35 U.S.C. §321, 37 C.F.R. §42.304, and §18 of the Leahy-Smith America Invents Act, dated Dec. 26, 2015, 6 pages.

* cited by examiner

VOLATILITY BASED FUTURES PRODUCTS

BACKGROUND

Futures contracts are financial products corresponding the purchase and sale of financial instruments and/or physical commodities for delivery at a future date. For example, a futures contract represents a binding agreement to buy or sell the underlying instrument at a specified price at some specified future date under certain specified conditions. In some cases, the futures contract may be settled in cash, such as on a financial exchange. For example, at settlement or otherwise upon expiration of the contract, a financial exchange may facilitate an exchange of value by computing a value of the positions held by the parties to the futures contract with respect to the market value of the underlying asset. Further, the financial exchange may provide the marketplace in which the futures contracts may be traded. A clearinghouse associated with the financial exchange may be used to confirm, match and/or settle positions after a specified time period, such as at the end of a trading day. The daily cash settlement calculated for a particular futures product may be used, for example, to determine a margin requirement (e.g., performance bond) that may be used to offset a risk associated with the futures contract.

SUMMARY

This Summary is provided to introduce a selection of concepts in a simplified form that are further described below in the Detailed Description. This Summary is not intended to identify key or essential features of the invention.

In some embodiments, a method of providing a financial product may include obtaining, by a computer device, pricing information about a financial market over a specified duration, the pricing information including at least a high price and a low price occurring within the duration. The computer device may be further configured for determining a volatility associated with the market, the volatility based, at least in part, on the pricing information and determining a settlement price for a cash settled futures product using the volatility of the market over the specified duration.

In some embodiments, a method may include determining, by the computer device, a volatility associated with the market, the volatility based, at least in part, on at least two of an open price, a close price, a high price and a low price, the prices corresponding to a financial market and the volatility corresponding to market volatility over a specified duration. The method may further include determining a settlement price for a cash settled futures product based, at least in part, on the volatility of the market.

In some embodiments, a computer system may be configured for providing a financial product and may include at least a processor and a non-transitory memory communicatively coupled to the processor. The memory may be configured to store instructions, that when executed, cause the processor to obtain pricing information about a financial market over a specified duration, the pricing information including at least a high price and a low price occurring within the specified duration. The instructions may further cause the processor to determine a volatility associated with the market, the volatility based, at least in part, on the pricing information and determine a settlement price for a cash settled futures product based, at least in part, on the volatility of the market over the specified duration.

Embodiments include, without limitation, methods for determining a margin requirement for an account, computer systems configured to perform such methods, and computer-readable media storing instructions that, when executed, cause a computer system to perform such methods.

Additional or alternative embodiments may be partially or wholly implemented on a computer-readable medium, for example, by storing computer-executable instructions or modules, or by utilizing computer readable data structures.

Of course, the methods and systems of the above-referenced embodiments may also include other additional elements, steps, computer-executable instructions or computer-readable data structures. In this regard, other embodiments are disclosed and claimed herein as well.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Illustrative futures contracts may correspond to an energy market (e.g., oil, gasoline, natural gas, ethanol, diesel, etc.), a currency (e.g., Dollar, Euro, Pound, Yen, etc.), a financial indicator (e.g., an interest rate), an index (e.g., one or more different stock market indices), a metal (e.g., aluminum, gold, platinum, palladium, copper, silver, etc.), a commodity (e.g., corn, wheat, soybeans, rice, hogs, pork bellies, etc.), real estate (e.g., commercial, residential, etc.) or other different events and/or indicators that may affect a financial market, such as weather (e.g., weather degree day, hurricane, rainfall, snowfall, frost, etc.) or an economic event (e.g., a statistical release). In some cases, a futures product may be designed to be cash settled to a volatility index, such as a volatility of a financial market.

For example, the Chicago Board Options Exchange (CBOE) offers a futures contract (e.g., S&P 500 Volatility Index (VIX)) that is cash settled to an index of implied volatilities sampled from various Standard & Poor's (S&P) 500 options traded on CBOE. An implied volatility may correspond to a volatility that is implicit in the level of the option price or option premium. For example, an option premium will generally rise to reflect a higher volatility in an associated marketplace. Conversely, the option premium will generally decline to reflect a reduced volatility in the same marketplace. In many cases, the implied volatilities (IVs) may generally be expressed as an annualized standard deviation of day-to-day or close-to-close returns in the underlying market upon which the option is based. Another illustrative volatility product provided by the CBOE was based on a realized, or historical, variance of close-to-close returns in the spot S&P 500 Index. The Chicago Mercantile Exchange (CME) Group has provided a number of different futures products that are designed to be cash settled to the realized or historical standard deviation of close-to-close price movements corresponding to one or more futures contracts offered on by the CME Group. However, these volatility products were based upon a standard deviation and/or variance of close-to-close prices quoted for a particular market. Such standard deviation calculations may often be susceptible to drift, stochastic volatility and/or gaps between closing prices and subsequent opening prices of the underlying financial market, leading to considerable bias and/or inefficiency. As such, there remains a need for improved systems and techniques to provide futures products based on a volatility index associated with a financial market that can, at least partially, compensate for pricing gaps and/or drift.

Exemplary Operating Environment

Figure 1:
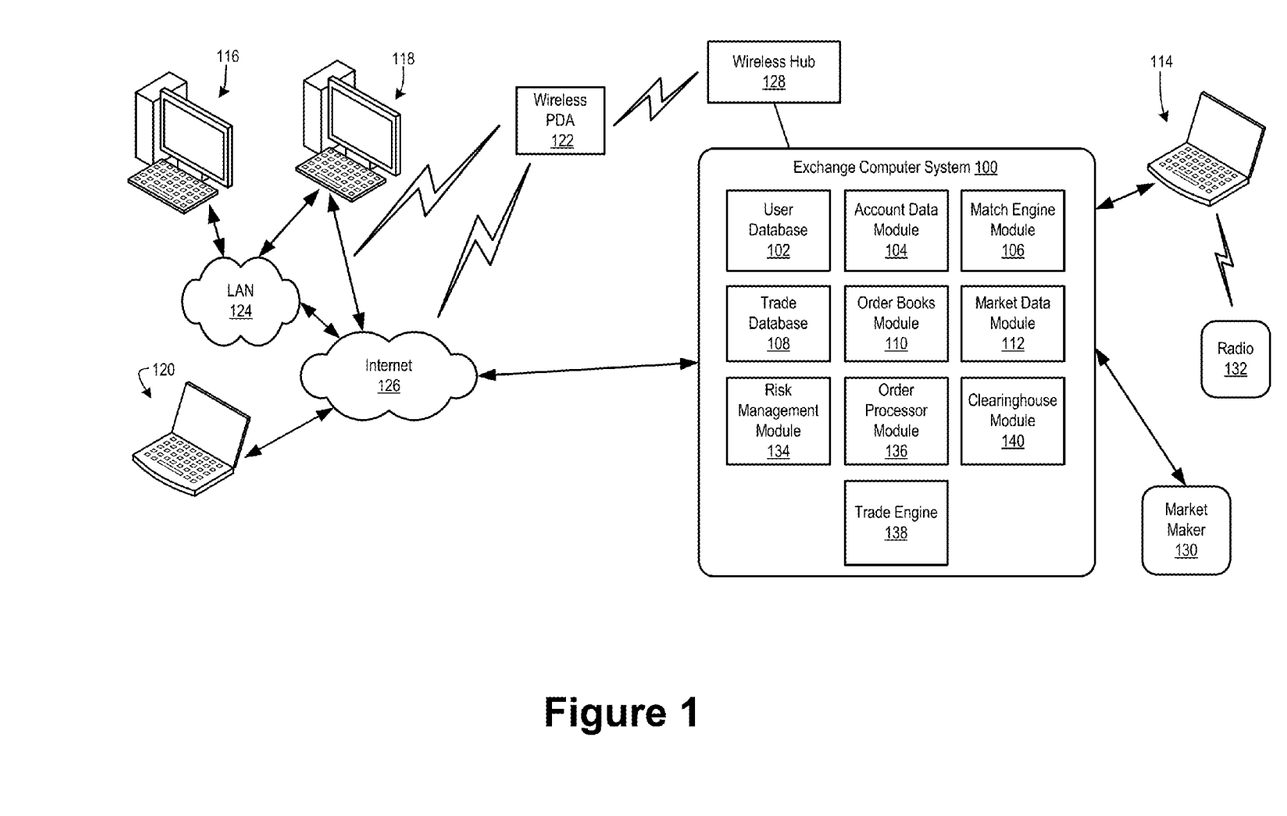
FIG. 1 shows an exemplary trading network environment for implementing trading systems and methods according to at least some embodiments.

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products of the exchange may include, without limitation, futures contracts, options on futures contracts ("futures contract options"), and other types of derivative contracts. Financial products traded or otherwise processed by the exchange may also include over-the-counter (OTC) products such as OTC forwards, OTC options, etc.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from and/or transmit data to trade database 108 and/or other modules of computer system 100 regarding trades of futures contracts, futures contracts options, OTC options and contracts, and other financial products. Clearinghouse module 140 may facilitate the financial product exchange acting as one of the parties to every traded contract or other product. For example, computer system 100 may match an offer by party A to sell a financial product with a bid by party B to purchase a like financial product. Module 140 may then create a financial product between party A and the exchange and an offsetting second financial product between the exchange and party B. As another example, module 140 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer device 116 may include computer-executable instructions for receiving market data from exchange computer system 100 and displaying that information to a user. As another example, clearinghouse module 140 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In at least some embodiments, the exchange computer system 100 (or "system 100") receives, stores, generates and/or otherwise and processes data to provide one or more financial products that may be based, at least in part, on a volatility of a financial market. For example, a futures contract may be based, at least in part, on an imputed volatility of a product traded on a financial market. The volatility of the underlying financial product may be used to determine a cash settlement price of the futures contract. These cash settlement prices may be used to determine a cash value of the futures contract when the futures contract expires. In other cases, the cash settlement price may be used to determine values of performance bonds that are associated with holdings including the volatility-based futures contract. A performance bond, also known as a "margin" or a "margin requirement" is typically calculated by an exchange, by a clearinghouse or by some other market entity to help reduce risk associated with a trader failing to fulfill obligations related to a particular asset or group of assets. A performance bond may represent a minimum amount of funds that must be deposited by a customer with a broker, by a broker with a clearinghouse member and/or by a clearinghouse member with a clearinghouse or exchange. These funds may then be used, for example, to help assure that losses associated with trading positions can be covered. One or more mathematical algorithms (e.g., a direct mathematical algorithm and/or an iterative mathematical algorithm) may be used to determine the cash settlement price of the volatility-based futures contract. For example, one or more of the mathematical algorithms (e.g., a Yang-Zhang estimator, a Parkinson estimator, a Garman-Klass estimator, a Rogers-Satchell estimator, a Garmin-Klass Yang-Zhang extension estimator, etc.) may be used to estimate the volatility. In some cases, one or more of the mathematical algorithms may be able to account for opening jumps and/or process (Brownian) drift, while still requiring only prices as inputs for calculation.

Figure 2:
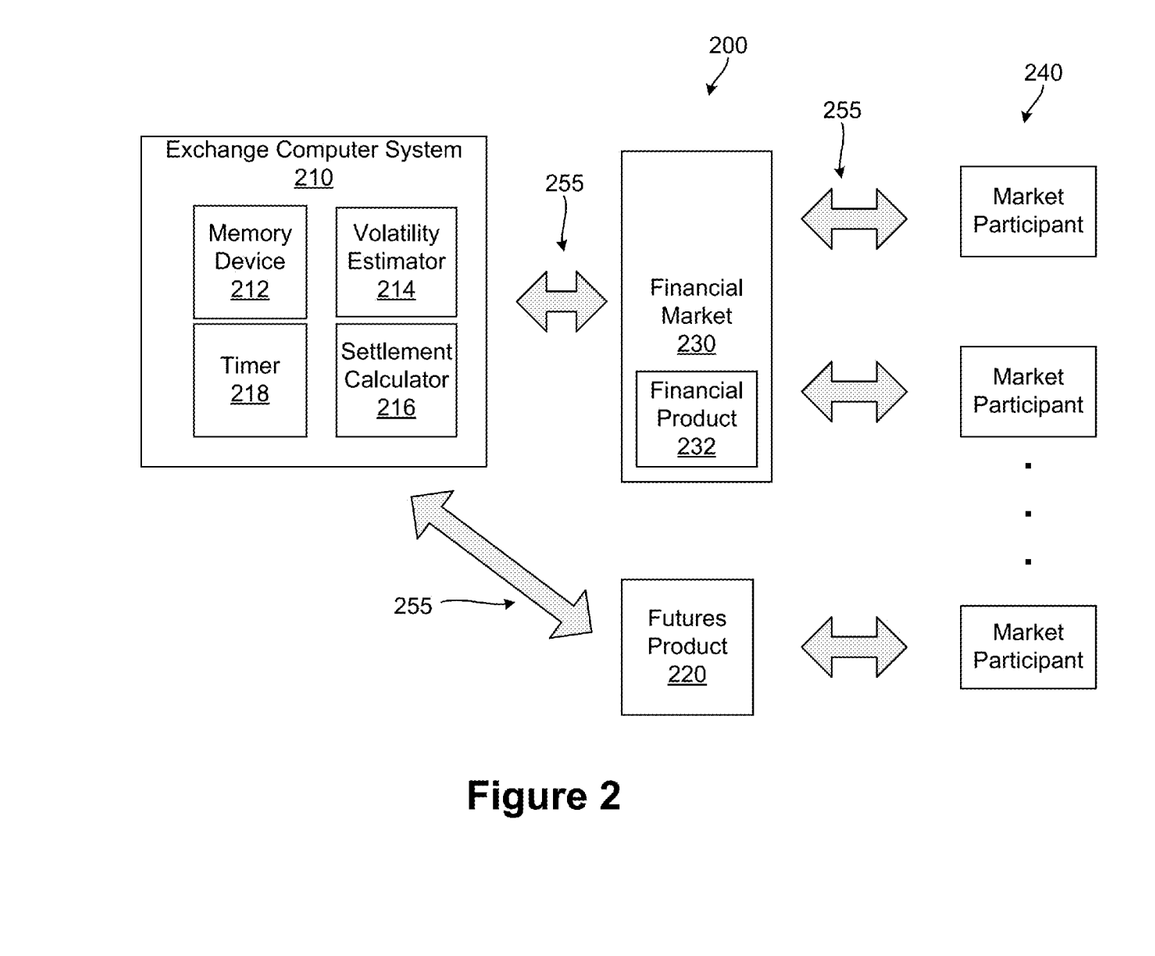
FIG. 2 shows a block diagram representation of a system for providing a financial product corresponding to a volatility of a financial market according to at least some embodiments.

FIG. 2 shows a block diagram representation of a system 200 for determining a futures product corresponding to a volatility of a financial market according to at least some embodiments. For example, a computer system, such as the exchange computer system 100 of FIG. 1 (e.g., an exchange computer system 210) may include a memory device 212, a volatility estimator 214, a settlement calculator 216, and/or a timer 218. In some cases, the exchange computer system 210 may be configured to provide, or otherwise determine, volatility associated with a particular financial market that may be used to compute a volatility-based cash settlement price of a volatility-based futures product 220. The volatility may be computed using one or more mathematical algorithms based on pricing information about the financial market 230 over a particular time frame (e.g., 1 hour, 8 hours, 24 hours, trading hours of a particular financial market 230, etc.). Once computed using the volatility estimator, the volatility may be used by the settlement calculator 216 to determine a cash settlement price associated with the time frame. In some cases, the exchange computer system may include a timer 218 for determining the timeframe. Sometimes, the timer 218 may be included in another computer device associated with the exchange computer system 100. In such cases, information about one or more timeframes used for computing volatility of the financial market may be communicated to the exchange computer system 210 via a network 255. The memory device 212 may be implemented with one or more physical or magnetic memory devices, such as a disk drive, magnetic memory, optical disk, or other device used to store computer-executable instructions. In one embodiment, the memory module 212 may be implemented with a random access memory RAM of a processor (not shown). In some cases, the memory device 212 may include a model associated with a volatility estimation technique that may be used by the volatility estimator when calculating volatility of the financial market 230.

In the illustrative system 200, one or more market participants (e.g., traders) may trade on a financial market 230. As a financial product (e.g., a security, a currency, a derivatives product, a commodity, etc.) is exchanged, many factors may influence pricing movements of the financial product. Uncertainty and/or risk associated with these pricing movements may be measured by computing volatility associated with the financial product. Volatility may be seen as a measure of an amount of the uncertainty and/or risk associated with changes in value (e.g., up or down) of the financial product over time (e.g., a day, a week, a month, etc.). For example, a higher volatility may correspond to a greater uncertainty about future price movements of the financial product. Traditionally, volatility may be measured using a standard deviation of pricing information of the financial product. For example, the standard deviation of a set of data may be calculated using the following formula:

$$\text{Standard Deviation} = 100 \cdot \sqrt{\left(\frac{252}{N}\right) \sum_{t=1}^{N} \left(\ln \frac{P_t}{P_{t-1}}\right)^2} \quad \text{(equation 1)}$$

where N is the number of elements in the sample, and $P_t$ is a reference to the price at time t, such as the price at the close of the financial market (e.g., a closing price). As can be seen, the standard deviation formula weights each observation on an exponential basis, for example, $$\left(\ln \frac{P_t}{P_{t-1}}\right)^2,$$

causing the standard deviation to attribute exponentially more weight to larger observations of day to day returns. Such a bias is exaggerated in the context of variance quotations, noting that the variance of a sampled data set may be seen as the standard deviation squared. Other exponentially weighted volatility measurements may be used as a basis of a futures product, however such volatilities may not accurately reflect the volatility because certain events (e.g., earnings reports) may cause prices before the event to be weighted less heavily than prices after the event. In some cases, such a reliance on exponential factors may impart an unwarranted bias in the resulting figure. Another problem with the traditional standard deviation metric is that it does not handle departures from geometric Brownian motion like drift, stochastic volatility, and opening gaps. These data features induce considerable bias and inefficiency in the traditional standard deviation estimate, causing any estimation of volatility to not accurately reflect true market volatility.

To provide a better measurement of market volatility to use as a basis for the futures product 220, one or more different volatility estimation techniques may be used separately, or in combination, by the volatility estimator 214. While the standard deviation and/or exponentially weighted volatility measurements may be based off a closing price of a financial market, one or more other techniques may use a combination of different prices (e.g., an opening price, a closing price, a high price, a low price, etc.) associated with a desired timeframe. These volatility estimation techniques may include one or more of a Parkinson estimator, a Garman-Klass estimator, a Rogers-Satchell estimator, a Yang-Zhang estimator, and a Yang-Zhang extension of the Garman Klass estimator.

The Parkinson estimator was created in 1980 and uses a high price and a low price over a duration, instead of using closing prices. This estimator may assume continuous trading is used to estimate volatility of returns for a random walk using the high price and the low price in any particular time frame (e.g., 10 hours, 1 day, 10 days, 20 days, etc.). A Parkinson estimator may include the assumption that prices of the underlying financial product follow geometric Brownian motion. The Parkinson variance estimator may be seen as being about 5 times as efficient as a conventional close-to-close (e.g., standard deviation, exponential, etc.) estimator. The high and low pricing information may be used to give more detail of movements during the particular time period of interest. The improved efficiency of the Parkinson estimator results from fewer observations being necessary to gain a similar statistical precision as using an estimator based merely on the closing price of the financial product. The Parkinson estimator may use the following formula:

$$\text{Parkinson Volatility} = \sigma_P = \sqrt{\left(\frac{F}{N}\right)} \sqrt{\left(\frac{1}{4\ln(2)}\right) \sum_{t=1}^{N} \left(\ln \frac{h_t}{l_t}\right)^2} \quad \text{(equation 2)}$$

Where F is a constant, $h_t$ is the high price over the number of samples N, and $l_t$ is the low price over the same number of samples N.

The Garman-Klass estimator may be seen as an extension of the Parkinson Estimator, and incorporates the open and close prices and the trading hours of the particular underlying financial product when estimating volatility. Again, the Garman-Klass estimator may include the assumption that prices of the underlying financial product follow geometric Brownian motion. The efficiency of the Garman-Klass estimator is much greater than the close-to-close estimators discussed above. Further, this efficiency results in fewer observations being necessary to gain the same statistical precision as the close-to-close estimator. Sometimes, however, volatility estimates using the Garman-Klass estimator and/or the Parkinson estimator may be more biased than the close-to-close estimator, despite the greater efficiency. A Ball-Torous estimator may be used to find the minimum-variance range-based estimator by solving for the maximum likelihood estimator of the joint distribution of high, low, and closing prices. A Kunitomo estimator and a Rogers-Satchell estimator may allow for a drift term in the Parkinson estimator and Garman-Klass estimator, respectively. The Rogers-Satchell estimator may include a model in a continuous-time framework that corrects a downward bias towards estimates of true variance when the time interval between price changes is known. For example, the Rogers-Satchell volatility estimator may be used to measure volatility for financial products having a non-zero mean. However, this estimator may not handle discontinuities (e.g., jumps) in the pricing information. The Rogers-Satchell estimator may use the following formula:

$$\sigma_{RS} = \sqrt{\left(\frac{F}{N}\right)} \sqrt{\sum_{t=1}^{N} \left(\ln \frac{h_t}{c_t}\right)\left(\ln \frac{h_t}{o_t}\right) + \left(\ln \frac{l_t}{c_t}\right)\left(\ln \frac{l_t}{o_t}\right)} \quad \text{(equation 3)}$$

Where $\sigma_{RS}$ is the Rogers-Satchell volatility, $h_t$ is the high price, $l_t$ is the low price, $o_t$ is the open price and $c_t$ is the close price over the time period of interest. The Garman-Klass estimator may use the following formula:

$$\sigma_{GK} = \sqrt{\left(\frac{F}{N}\right)} \sqrt{\sum_{t=1}^{N} \frac{1}{2}\left(\ln \frac{h_t}{l_t}\right)^2 - (2\ln(2) - 1)\left(\ln \frac{c_t}{o_t}\right)^2} \quad \text{(equation 4)}$$

Where $\sigma_{GK}$ is the Garman-Klass volatility, F is a constant, N is the number of samples, $h_t$ is the high price, $l_t$ is the low price, $o_t$ is the open price and $c_t$ is the close price over the time period of interest. The Yang-Zhang extension of the Garman-Klass estimator may be used to handle discontinuities (e.g., jumps) in the pricing information. However, this estimator assumes a zero drift and may overestimate the volatility if a financial product has a non-zero mean. While any effect of drift may be small and continuous pricing information may not always be available, this estimator may underestimate the volatility. However, this underestimation may be less than other, previously mentioned, estimators. The Yang-Zhang extension Garman-Klass estimator may use the following formula:

$$\sigma_{GKYZ} = \sqrt{\left(\frac{F}{N}\right)}\sqrt{\sum_{t=1}^{N}\left(\ln\frac{o_t}{c_{t-1}}\right)^2 + \frac{1}{2}\left(\ln\frac{h_t}{l_t}\right)^2 - (2\ln(2)-1)\left(\ln\frac{c_t}{o_t}\right)^2}$$ (equation 5)

Where $\sigma_{GKYZ}$ is the Garman-Klass Yang-Zhang extension volatility, F is a constant, N is the number of samples, $h_t$ is the high price, $l_t$ is the low price, $o_t$ is the open price and $c_t$ is the close price on day t in the time period of interest.

The Yang-Zhang estimator was designed to measure volatility when the financial product is subject to both discontinuities (e.g., opening pricing jumps) and drift in the pricing information. The Yang-Zhang estimator may be seen to include the sum of the overnight volatility (e.g., the close to open volatility) and a weighted average of the Rogers-Satchell volatility and the open-to-close volatility. The Yang-Zhang estimator may use the formula:

$$\sigma_{YZ}^2 = \sigma_o^2 + k\sigma_c^2 + (1-k)\sigma_{rs}^2$$ (equation 6)

Where $\sigma_{YZ}$ is the volatility to be estimated using the Yang-Zhang estimator, $\sigma_o$ is the overnight volatility, $\sigma_c$ is the open to close volatility, $\sigma_{rs}$ is the Rogers-Satchell volatility, $H_t$ is the high price, $L_t$ is the low price, $O_t$ is the open price and $C_t$ is the close price on day t in the time period of interest. $c_t = \ln C_t - \ln O_t$ is the normalized close price. $o_t = \ln O_t - \ln C_{t-1}$ is the normalized open price, $u_t = \ln H_t - \ln O_t$ is the normalized high price, $d_t = \ln L_t - \ln O_t$ is the normalized low price, and n is the number of daily periods. Further, $$k = \frac{0.34}{1.34 + \frac{n+1}{n-1}}; \min(k) \text{ when } n=2$$ (equation 7)

$$\sigma_o^2 = \frac{1}{n-1}\sum_{i=1}^{n}\left[(o_i) - \frac{1}{n}\sum_{i=1}^{n}(o_i)\right]^2$$ (equation 8)

$$\sigma_c^2 = \frac{1}{n-1}\sum_{i=1}^{n}\left[(o_i + c_i) - \frac{1}{n}\sum_{i=1}^{n}(o_i + c_i)\right]^2$$ (equation 9)

$$\sigma_{rs}^2 = \frac{1}{n}\sum_{i=1}^{n}[u_i(u_i - c_i) + d_i(d_i - c_i)]$$ (equation 10)

In some cases, one or more of the above mentioned estimators may be used to calculate volatility over a certain specified timeframe (e.g., a portion of a day, a day, a week, a month, etc.). One or more embodiments may be used to calculate volatility for a specific time frame. In some cases, the underlying financial product 232 may be used to determine a particular time frame to be used in the volatility calculation. For example, a major currency (e.g., the dollar, the pound, the Yen, etc.) may be subject to a 24-hour volatility calculation window. However, a different local currency may be limited to a calculation window corresponding to local trading hours of that particular currency.

Once the volatility has been estimated using one or more volatility estimators, the settlement calculator 216 may calculate a cash settlement price for the futures product 220 (e.g., futures contract), based at least in part on the calculated volatility of the underlying financial product (e.g., a currency, a market index, a security, a metal, a commodity, etc.). In an illustrative embodiment, the volatility estimator 214 may be configured to compute the volatility of the underlying financial product 232 over a specified time period using the above mentioned Yang-Zhang estimator. The settlement calculator 216 may receive the computed volatility from the volatility estimator 214 and, in turn, compute a cash settlement price to be associated with the futures product 220 for the specified time period. In some cases, the cash settlement price may be based primarily on the computed volatility received from the volatility estimator. In other cases, the settlement calculator 216 may compute the cash settlement price using a mathematical equation. For example, the settlement calculator 216 may apply a mathematical transformation (e.g., an offset, a weighting factor, etc.) to the received volatility value when determining the cash settlement price. In other cases, the settlement calculator 216 may compute the cash settlement value using two or more different volatility estimates. For example, the settlement calculator 216 may average or otherwise combine two or more volatility values computed over a different time period (e.g., successive days). In some cases, the settlement calculator may combine two or more different volatility values (e.g., average, mean, etc.) obtained from different volatility estimators, such as the Yang-Zhang estimator, the Parkinson estimator, the Garman-Klass estimator, the Rogers-Satchell estimator, and a Yang-Zhang extension of the Garman-Klass estimator.

Figure 3:
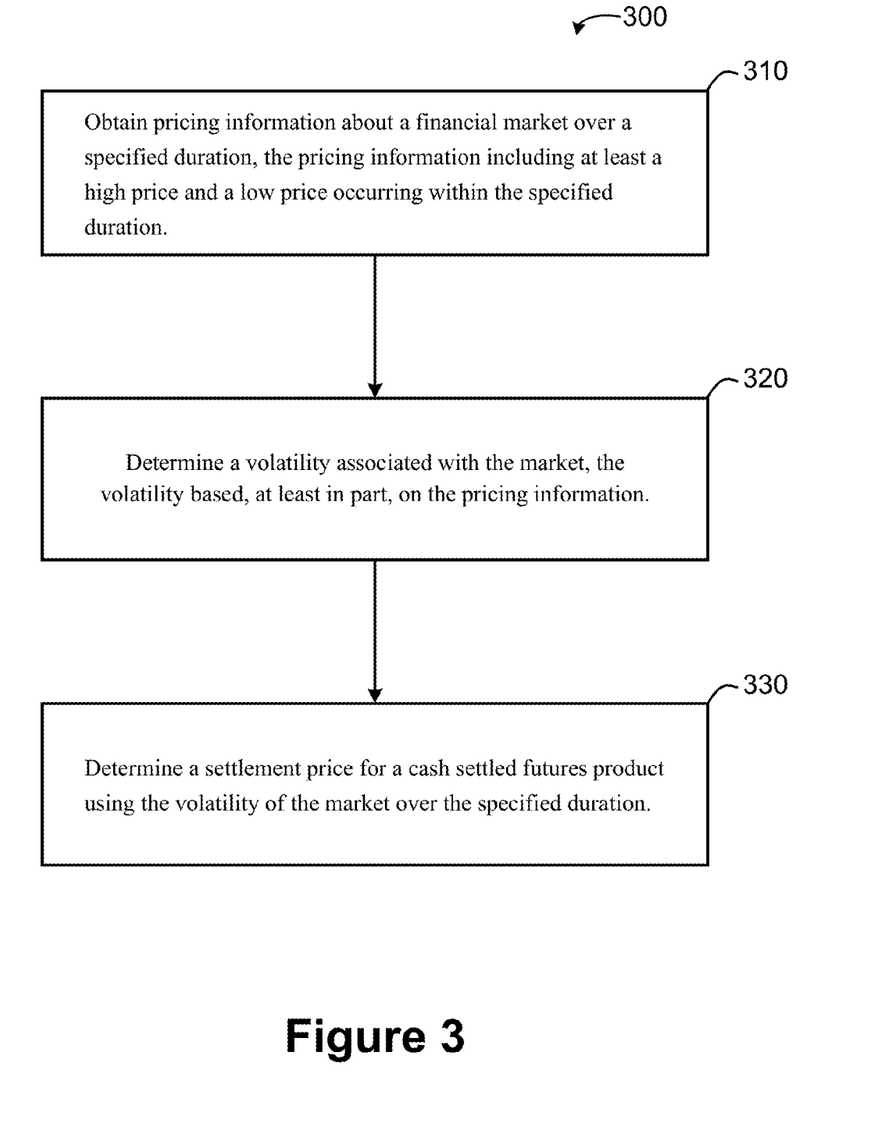
FIG. 3 is a flow chart showing steps performed in methods according to at least some embodiments.

FIG. 3 is a flow chart showing steps performed in methods according to at least some embodiments. In some cases, an illustrative method 300 may begin at 410 by obtaining, such as by at least a portion of the exchange computer system 100 (e.g., the volatility generator 214), pricing information about a financial market 230 (e.g., the financial product 232) over a specified duration that may be determined by the timer 218. The pricing information may include at least a high price and a low price, such as of the financial product 232, occurring within the specified duration. In some cases, the pricing information may include an opening price of the financial product 232 near the start of the duration, and a closing price of the financial product 232 near the end of the duration. In some cases, the timer 218 may be configured to define a time period associated with trading activity on the financial market 230, such as a trading day. In other cases, the duration may correspond to a different time period that may be up to or including a 24-hour time period (e.g., about 1 hour, about three hours, etc.). In other cases, the duration may be a time period greater than 24 hours, (e.g., about 2 days, about 1 week, about 1 month, etc.). At 320, the volatility estimator 214 may determine a volatility value associated with the financial market, where the volatility may be based, at least in part, on the pricing information. For example, the volatility estimator 214 may be configured to compute the volatility of the financial product over a duration that may be defined by the timer 218 using a mathematical function including at least one of a Parkinson equation, a Garman-Klass equation, a Rogers-Satchell equation, Garman-Klass Yang-Zhang extension equation and a Yang-Zhang equation.

At 330, the exchange computer system 210 (e.g., the settlement calculator) may be configured to determine a settlement price for a cash settled futures product 220 using the volatility of the market 230 over the specified duration. In some cases, the settlement calculator 216 may compute the settlement price using a mathematical transformation of the volatility estimation obtained from the volatility estimator 214. For example, the settlement calculator 216 may apply an offset and/or a weighting factor to the volatility value before computing the settlement price. In another embodiment, the settlement calculator may apply an offset and/or a weighting factor to a calculated settlement value associated with the futures product. In some embodiments, the settlement calculator may receive two or more different volatility estimates and use the two or more different volatility estimates when determining the settlement price. For example, the settlement calculator 216 may be configured to combine the different volatility estimates as an average, a mean or by using another mathematical function (e.g., weighting factors).

In some embodiments, the exchange computing system 210, such as the volatility estimator 214, may be configured to determine a volatility associated with the financial market 230. The volatility may be based, at least in part, on at least two of an open price of the financial product 232, a close price of the financial product 232, a high price of the financial product and a low price of the financial product over a specified duration (e.g., less than a trading day, about a trading day, about a day, about a week, etc.). In some cases, the volatility estimator 214 may determine the volatility of the underlying financial product by modeling a pricing difference over a discontinuity of the price of the financial product 232, such as between a market close price and a following market open price. In some cases, the volatility estimator may be a Yang-Zhang volatility estimator. In some embodiments, the volatility estimator may include at least one of a Parkinson estimator, a Garman-Klass estimator, a Rogers-Satchell estimator, a Garmin-Klass Yang-Zhang extension estimator. In such cases, the exchange computer system 210 may include a user interface that may be used to communicate at least a computed volatility. In some cases, the user interface may be used to facilitate a choice of volatility model for use with by the volatility estimator 214. The settlement calculator 216 may be configured to determine a settlement price for the cash settled futures product 220 based, at least in part, on the volatility of the financial market, such as a volatility of an index associated with the financial market and/or the volatility of the underling financial product 232.

CONCLUSION

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that some steps illustrated in the figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from the above-described embodiments are the within the scope of the invention.

The invention claimed is:

1. A method comprising:
obtaining, by a market data module of an exchange computing system from a financial exchange computing system via a network by the exchange computing system comprising at least one volatility estimator, a settlement calculator, and pricing information about a financial market over a specified duration, the pricing information including at least a high price and a low price occurring within the specified duration, wherein the network comprises the Internet, wherein obtaining the pricing information further comprises obtaining, via the network by the exchange computing system from the financial exchange computing system, an opening price at a start of the duration and a closing price at an end of the duration;
determining, by the at least one volatility estimator of the exchange computing system, a volatility value associated with the market based on one or more volatility estimation algorithms, the volatility value based, at least in part, on the pricing information;
transforming, by the settlement calculator of the exchange computing system, the volatility value into a cash settlement price for a cash settled futures product based on information from one or more volatility estimators; and
offering, to a market participant by the exchange computing system via a network interface, the cash settled futures product to a market participant via the network by the exchange computing system, wherein the cash settled futures product is based on the volatility value determined by the volatility estimator.

2. The method of claim 1, wherein determining the volatility associated with the market by the volatility estimator, comprises determining the volatility using a volatility estimator based on a Parkinson equation.

3. The method of claim 1, wherein determining the volatility associated with the market, by the volatility estimator comprises determining the volatility using a volatility estimator based on a Garman-Klass equation.

4. The method of claim 1, wherein determining the volatility associated with the market, by the volatility estimator comprises determining the volatility using a volatility estimator based on a Rogers-Satchell equation.

5. The method of claim 1, wherein determining the volatility associated with the market, by the volatility estimator comprises determining the volatility using a volatility estimator based on a Yang-Zhang equation.

6. The method of claim 1, wherein determining the volatility associated with the market, by the volatility estimator comprises determining the volatility using a volatility estimator based on a Garman-Klass Yang-Zhang extension equation.

7. The method of claim 1, wherein the duration corresponds to a duration of trading activity on the financial market determined by a timer of the exchange computing system.

8. The method of claim 1, wherein the duration corresponds to at least a 24-hour volatility calculation window determined by a timer of the exchange computing system.

9. The method of claim 1, wherein determining the settlement price for the cash settled futures product comprises the settlement calculator of the exchange computing system using a mathematical transformation of the volatility of the market over the specified duration.

10. A method comprising:
receiving, by a market data module of an exchange computing system from a financial exchange computing system via the internet, pricing information about a financial market computing system corresponding to a specified duration, the pricing information including at least a high price and a low price occurring within the specified duration;
determining, by a volatility estimator of the exchange computing system, a volatility associated with a financial market, the volatility based, at least in part, on at least two of an open price, a close price, the high price and the low price corresponding to the financial market, the volatility corresponding to market volatility over the specified duration, the specified duration received from a timer; and
transforming, by a settlement calculator of the exchange computing system, a cash settlement price for a cash settled futures product based, at least in part, on the volatility of the market;
communicating, to a clearinghouse module of the exchange computing system, the cash settlement price for use in computing a performance bond requirement associated with the cash settled futures product; and
offering, via the Internet by the exchange computing system, the cash settled futures product to a market participant, wherein the cash settled futures product is based on the volatility determined by the volatility estimator.

11. The method of claim 10, wherein determining the volatility associated with the market comprises calculating the volatility using a mathematical algorithm including a Yang-Zhang estimator.

12. The method of claim 10, wherein determining the volatility associated with the market comprises calculating the volatility using a mathematical algorithm including at least one of a Parkinson estimator, a Garman-Klass estimator, a Rogers-Satchell estimator, a Garmin-Klass Yang-Zhang extension estimator.

13. The method of claim 10, wherein determining the volatility associated with the market comprises modeling a pricing difference between a market close price and a following market open price.

14. The method of claim 10, wherein the volatility corresponds to a duration where the financial market is open for trading.

15. The method of claim 10, wherein the volatility corresponds to a duration greater than or equal to 24 hours.

16. The method of claim 10, wherein the volatility corresponds to a duration less than a trading day of the financial market.

17. A system comprising:
a user interface;
a processor of an exchange computing system;
a non-transitory memory communicatively coupled to the processor, the memory storing instructions, that when executed, cause the processor to:
obtain, at the exchange computing system via the internet, pricing information about a financial market over a plurality of different timeframes, the pricing information including at least a high price and a low price occurring within each of the plurality of timeframes;
determine, by a volatility estimator of the exchange computing system, a volatility associated with the market based on an input received via the user interface, the volatility based, at least in part, on the pricing information for each of the plurality of timeframes; and
determine, by a settlement calculator of the exchange computing system, a settlement price for a cash settled futures product based, at least in part, on the volatility of the market for at least two of the plurality of timeframes; and
offer, to a market participant via a network interface, the cash settled futures product to a market participant via the network by the exchange computing system, wherein the cash settled futures product is based on the volatility determined by the volatility estimator.

18. The system of claim 17, wherein the non-transitory memory stores instructions, that when executed, cause the processor to enable to volatility estimator to determine the volatility of the market using a Yang-Zhang estimator.

19. The system of claim 17, further comprising:
a financial market computer device configured to communicate financial market pricing information over a network; and
wherein, the non-transitory memory stores instructions, that when executed, cause the processor to:
determine, by a timer, a specified duration in which to determine the volatility of the financial market, wherein the duration is specified as a duration different than a trading day of the financial market; and
determine, by the volatility estimator, at least the high price, the low price, an opening price, and a closing price of the financial market during the specified duration using the financial market pricing information communicated by the financial market computer device.

* * * * *

UNITED STATES PATENT AND TRADEMARK OFFICE
CERTIFICATE OF CORRECTION

PATENT NO.         : 9,710,854 B2
APPLICATION NO.    : 14/134922
DATED              : July 18, 2017
INVENTOR(S)        : John Labuszewski et al.

It is certified that error appears in the above-identified patent and that said Letters Patent is hereby corrected as shown below:

In Column 13, Claim 12, Line 40:
Please delete "Garmin-Klass" and insert --Garman-Klass--

Signed and Sealed this
Twentieth Day of February, 2018

Andrei Iancu
*Director of the United States Patent and Trademark Office*